United States Patent [19]
Enari et al.

[11] Patent Number: 5,995,171
[45] Date of Patent: Nov. 30, 1999

[54] CODING AND/OR DECODING APPARATUS FOR DECODING VARIABLE-LENGTH CODED IMAGE INFORMATION

[75] Inventors: Masahiko Enari; Ikuo Watanabe, both of Yokohama, Japan

[73] Assignee: Canon Kabushiki Kaisha, Tokyo, Japan

[21] Appl. No.: 08/478,677

[22] Filed: Jun. 7, 1995

Related U.S. Application Data

[63] Continuation of application No. 07/962,649, Oct. 19, 1992, abandoned.

[30] Foreign Application Priority Data

Oct. 22, 1991 [JP] Japan .................................. 3-273973

[51] Int. Cl.⁶ .................................................. H04N 7/32
[52] U.S. Cl. ................................... 348/845.1; 348/845.3; 348/420
[58] Field of Search ................................... 348/400, 624, 348/390, 616, 421, 405, 423, 523, 521, 410, 420, 845.1, 845.3; 358/327, 336; 386/81, 65, 112, 111, 109; 371/42, 54; H04N 7/32

[56] References Cited

U.S. PATENT DOCUMENTS

| | | | |
|---|---|---|---|
| 3,873,920 | 3/1975 | Apple, Jr. et al. | 317/42 |
| 4,364,081 | 12/1982 | Hashimoto et al. | 348/421 |
| 4,580,162 | 4/1986 | Mori | 348/400 |
| 4,651,206 | 3/1987 | Ohki | 358/136 |
| 4,656,500 | 4/1987 | Mori | 348/396 |
| 4,807,033 | 2/1989 | Keesen et al. | 348/616 |
| 4,951,282 | 8/1990 | Mester | 371/5.1 |
| 5,075,783 | 12/1991 | Yoshida et al. | 358/439 |
| 5,111,294 | 5/1992 | Asai et al. | 358/105 |
| 5,148,271 | 9/1992 | Kato et al. | 348/390 |
| 5,148,272 | 9/1992 | Acampora et al. | 348/390 |
| 5,216,518 | 6/1993 | Yamagami | 358/138 |
| 5,218,622 | 6/1993 | Fazel et al. | 358/138 |
| 5,339,321 | 8/1994 | Paek | 348/624 |
| 5,355,379 | 10/1994 | Hobson et al. | 371/54 |

OTHER PUBLICATIONS

Petsalis et al, "Effects of Errors and Error Recovery in Images Compressed by the JPEG Still Image Compression Standard Algorithm", Canadian Conference on Electrical and Computer Engineering, vol. 1, pp. 396–400, 1994.

Sun et al, "Error Concealment with Directional Filtering for Block transform Coding", IEEE, pp. 1304–1308, 1993.

*Primary Examiner*—Vu Le
*Attorney, Agent, or Firm*—Fitzpatrick, Cella, Harper & Scinto

[57] ABSTRACT

In an apparatus for decoding image information which has been variable-length coded on a block unit basis of a plurality of pixels, the image information is decoded on the block unit basis, the number of blocks decoded in a predetermined period of time is counted, and the decoded image information is corrected by using the result of the counting.

24 Claims, 7 Drawing Sheets

CODING AND/OR DECODING APPARATUS FOR DECODING VARIABLE-LENGTH CODED IMAGE INFORMATION

This application is a continuation-in part of application Ser. No. 07/962,649 filed Oct. 19, 1992 now abandoned.

BACKGROUND OF THE INVENTION

1. Field of the Invention

The invention relates to an image coding/decoding apparatus and, more particularly, to an apparatus for decoding image information which has been variable-length coded on a block unit basis of a plurality of pixels.

2. Related Background Art

In recent years, in the field of the digital transmission of a color image, a high efficiency coding technique of information progresses and a high compression is being realized.

In association with such an improvement, a good image can be transmitted and received through a transmission line even at a low data rate. On the contray, an influence which is exerted on the image by an error of one word on the transmission line also increases. It is, therefore, necessary to take a countermeasure for the code error on the transmission line by an error detection code, an error correction code, and the like.

Particularly, in case of using a transmission line in which a deterioration of a transmission quality is presumed as in a magnetic recording medium, a communication satellite, or the like, it is necessary to particularly pay an attention to the countermeasure for such a code error.

Figure 5:
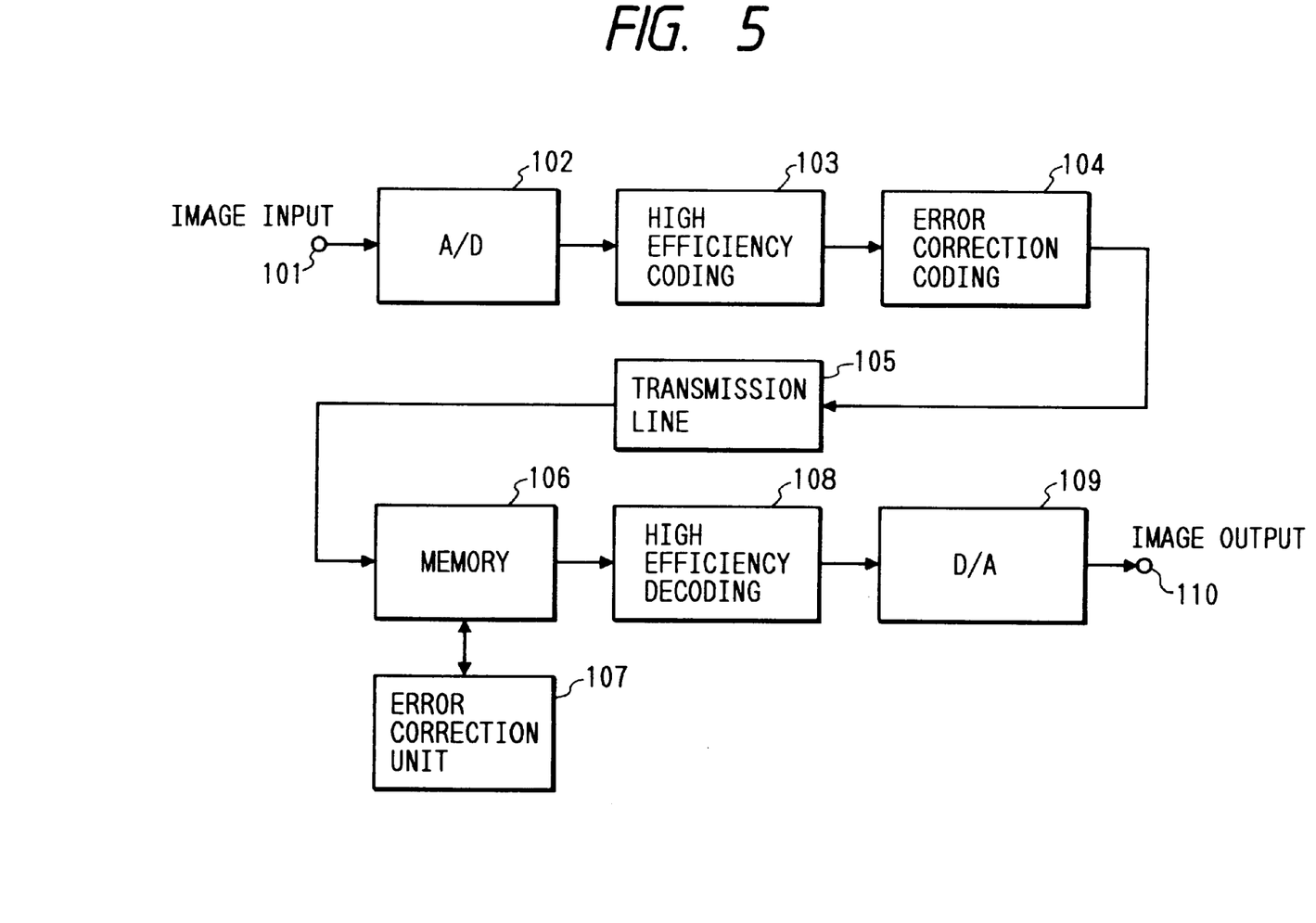
FIG. 5 is a block diagram showing a schematic construction of a conventional image transmitting and receiving system.

FIG. 5 is a block diagram showing a schematic construction of a conventional image transmitting and receiving system.

In the diagram, reference numeral 101 denotes a terminal to which an image signal is supplied. The image signal supplied from the terminal 101 is converted into the digital signal by an analog/digital (A/D) converter 102. The digital image signal is coded by a high efficient coding circuit 103 and its information amount (band) is compressed.

The image information compressed by the coding circuit 103 is supplied to an error correction coding circuit 104 and a parity check bit to correct a code error is added to the image information (the image information is error correction coded). After that, the image information is sent to a transmission line 105.

On the receiving side, a data train transmitted via the transmission line 105 is once accumulated in a memory 106. The code error correction using the above parity check bit is performed in an error correction unit 107 which accesses to the memory 106. The image information which has been code error corrected is generated from the memory 106 and sent to a high efficiency decoding circuit 108. The decoding circuit 108 executes the decoding process opposite to the coding process by the high efficiency coding circuit 103, that is, expands the information amount (band) and returns to the original digital image signal. the digital image signal is converted into the analog signal by a digital/analog (D/A) converter 109. The analog signal is generated as an analog image signal from a terminal 110.

In FIG. 5, as a construction of the high efficiency coding circuit 103, namely, an image compressing method, various kinds of methods have been proposed. As a typical one of the color image coding methods, what is called an ADCT (Adaptive Discrete Cosine Transform) method has been proposed. The ADCT method has been described in detail in Takahiro Saito, et al., "A Coding Method of Still Image", the magazines of The Institute of Television Engineers of Japan, Vol. 44, No. 2, 1990, Hiroshi Ochi, et al. "The International Standard Tendency of Still Image Coding", the papers of the National Convention of The Institute of Image Electronics Engineers of Japan, No. 14, 1988, and the like.

Figure 6:
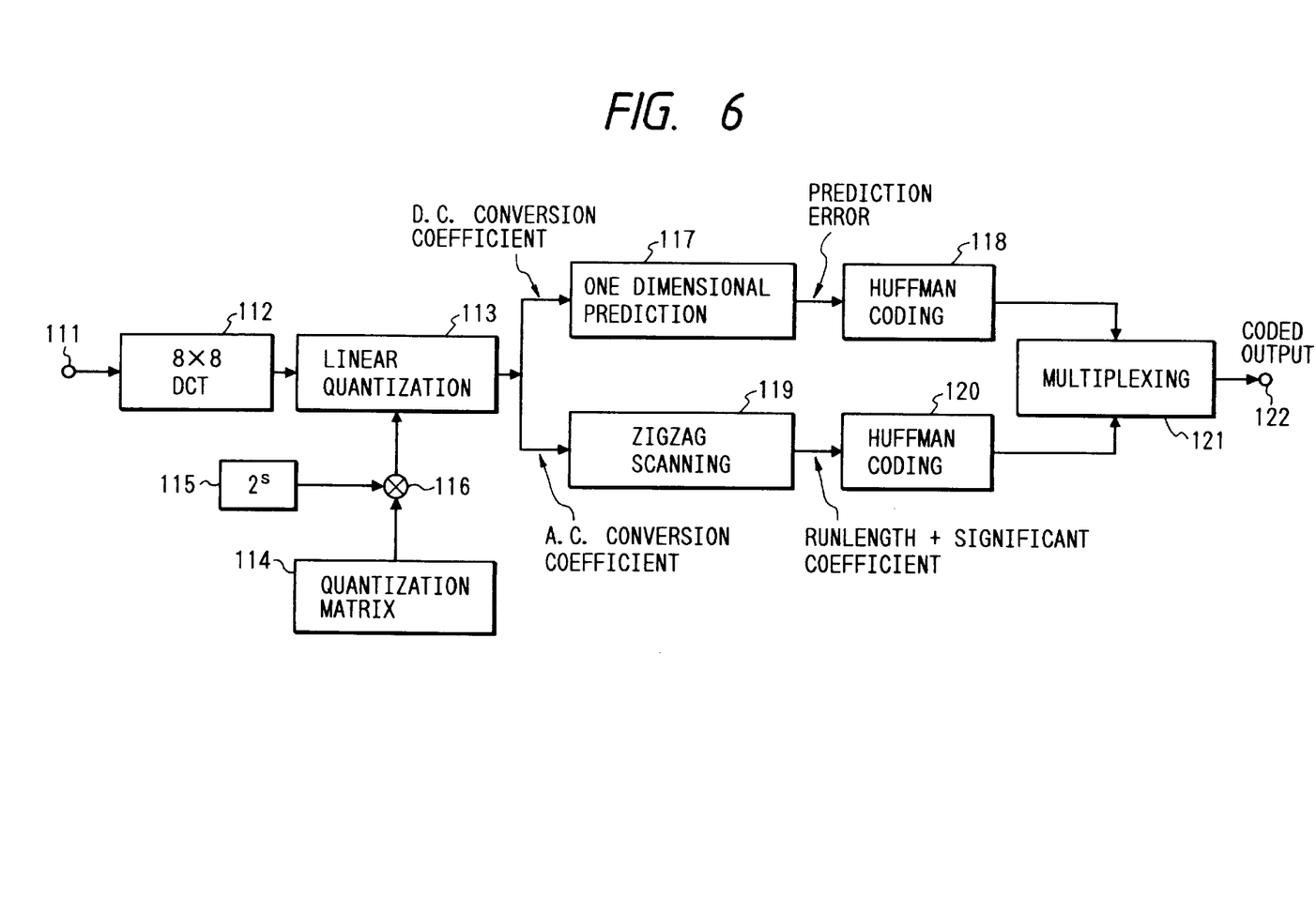
FIG. 6 is a block diagram schematically showing a construction of a high efficiency coding circuit of an image using an ADCT method.

FIG. 6 is a block diagram schematically showing a construction of a high efficiency coding circuit of an image using the above ADCT method.

In the diagram, it is assumed that an image signal which is supplied to a terminal 111 is a digital data train which have been converted into eight bits, namely, 256 gradations/color by the A/D converter 102 in FIG. 6. The number of colors is set to three or four such as RGB, YUV, YPbPr, YMCK, or the like.

The input digital image signal is immediately subjected to a two-dimensional discrete cosine transformation (hereinafter, referred to as a DCT) by a DCT converter 112 on a subblock unit basis of (8×8) pixels.

The data of (8×8) words which has been DCT converted (hereinafter, such data is referred to as conversion coefficients) is quantized by a linear quantization circuit 113. The quantization step size differs every conversion coefficient. That is, it is assumed that the quantization step size for each conversion coefficient is set to a value which is obtained by multiplying (8×8) quantization matrix elements from a quantization matrix generating circuit 114 by $2^S$ times by a multiplier 116.

The quantization matrix elements are determined in consideration of a fact that the visibility for quantization noises differs every conversion coefficient of the (8×8) words. An example of the quantization matrix elements are shown in Table 1.

TABLE 1

Example of quantization matrix elements

| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

On the other hand, although $2^S$ data are obtained from a data generator 115, S denotes 0 or a positive or negative integer and is called a scaling factor. The picture quality and a generation data amount are controlled by the value of S.

The DC component in each of the quantized conversion coefficients, namely, the DC conversion coefficients (hereinafter, referred to as a DC component) in the matrix of (8×8) is supplied to a one-dimensional prediction differential circuit 117, by which a prediction error is derived. The prediction error is subsequently Huffman coded by a Huffman coding circuit 118. Practically speaking, a quantization output of the prediction error is divided into a plurality of groups. The identification (ID) number of the group to which the prediction error belongs is first Huffman coded. Subsequently, the information indicating to which value in the group the prediction error is equal is expressed by an equal length code.

Figure 7:
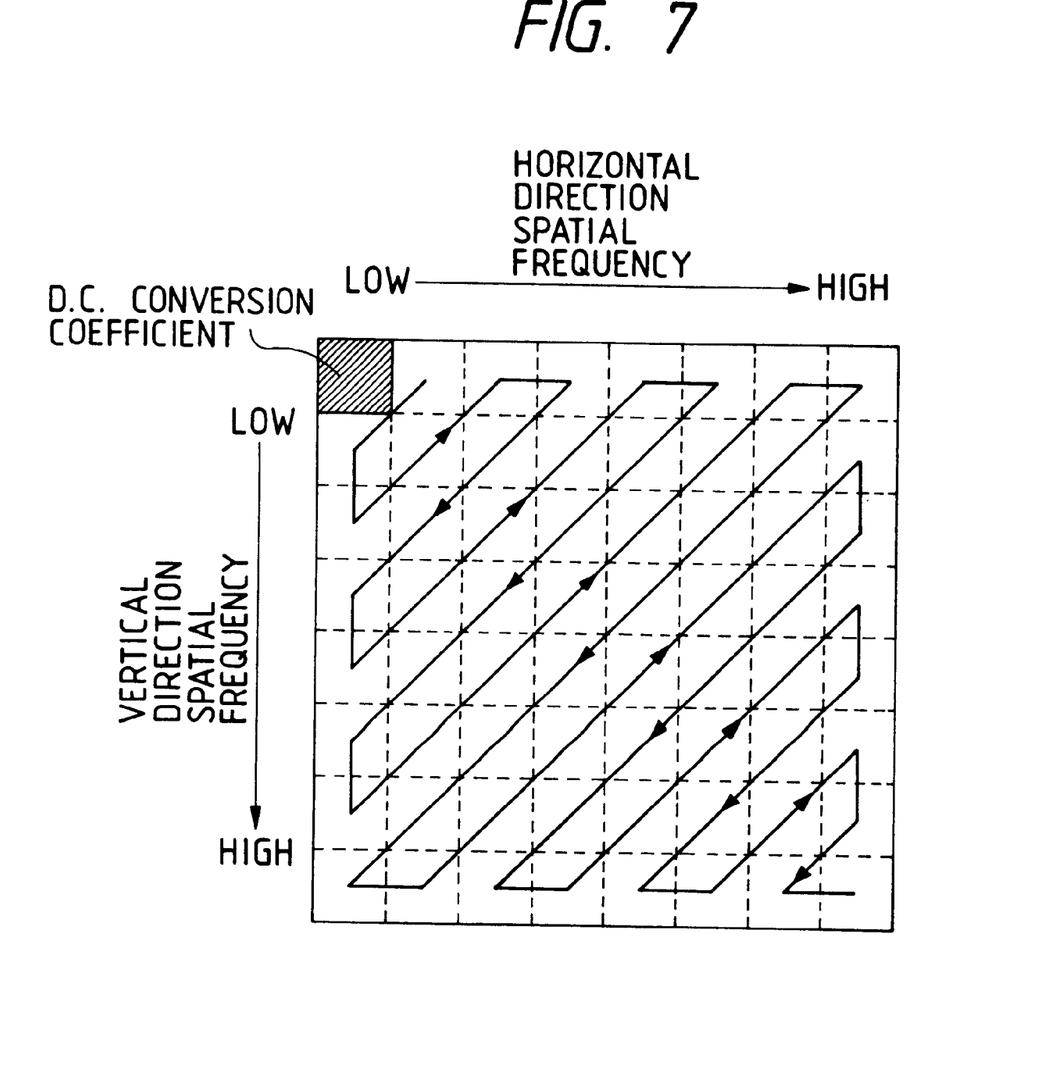
FIG. 7 is a diagram showing a state of the zigzag scan by a zigzag scanning circuit in FIG. 6.

The conversion coefficients other than the DC component, namely, the AC conversion coefficients (hereinafter, referred to as an AC component) are supplied to a zigzag scanning circuit 119 and are zigzag scanned by two-dimensional frequencies from a low frequency component to a high frequency component as shown in FIG. 7. The conversion coefficients in which the quantization output is not equal to 0 (hereinafter, such conversion coefficients are referred to as significant coefficients) and the number (run length) of conversion coefficients which exist between the significant coefficients just before those conversion coefficients and in which the quantization output is equal to 0 (hereinafter, such conversion coefficients are referred to as insignificant coefficients) are generated as a set from the zigzag scanning circuit 119 to a Huffman coding circuit 120.

In the Huffman coding circuit 120, the significant coefficients are classified into a plurality of groups in accordance with the values of the significant coefficients and the group ID number and the above run length are Huffman coded as a set. Subsequently, the information indicating to which value in the group the prediction error is equal is expressed by an equal length code.

Outputs from the Huffman coding circuits 118 and 120 are multiplexed by a multiplexing circuit 121. The multiplexed signal is supplied as a coded output from a terminal 122 to the error correction coding circuit 104 at the post stage.

According to the high efficiency coding as mentioned above, even when an information amount is compressed into a fraction of an integer, no image deterioration occurs and the information can be compressed at an extremely high efficiency.

However, when the information is compressed at a good compression efficiency as mentioned above, namely, at a high compression ratio, an influence which is exerted on the image by one code error becomes serious.

For example, in the case where the variable-length coding as mentioned above is executed, the subsequent decoding process cannot be performed, so that the image after the occurrence of the error is disturbed and it is very hard to see.

In recent years, particularly, such a kind of apparatus is used even for a transmission line such that there is also a case where the transmission quality changes by the weather and deteriorates as in the communication satellite, so that it is required to take a countermeasure to protect data for the occurrence of errors on the transmission line.

SUMMARY OF THE INVENTION

Under such circumstances, it is an object of the invention to provide an image decoding apparatus in which when decoding image information which has been variable-length coded on a block unit basis of a plurality of pixels, a code error can be detected without raising a redundancy degree of the information to be transmitted.

To accomplish the above object, according to an embodiment of the invention, there is provided an image decoding apparatus for decoding image information which has been variable-length coded on a block unit basis of a plurality of pixels, wherein the apparatus comprises: decoding means for decoding the image information on the above block unit basis; counting means for counting the number of blocks transmitted through the decoding means within a predetermined period of time; and correcting means for correcting the image information decoded by the decoding means by using an output of the counting means.

The above and other objects and advantages of the invention will become apparent from the following detailed description taken in conjunction with the accompanying drawings.

DETAILED DESCRIPTION OF THE PREFERRED EMBODIMENTS

An embodiment of the invention will now be described hereinbelow.

Figure 1:
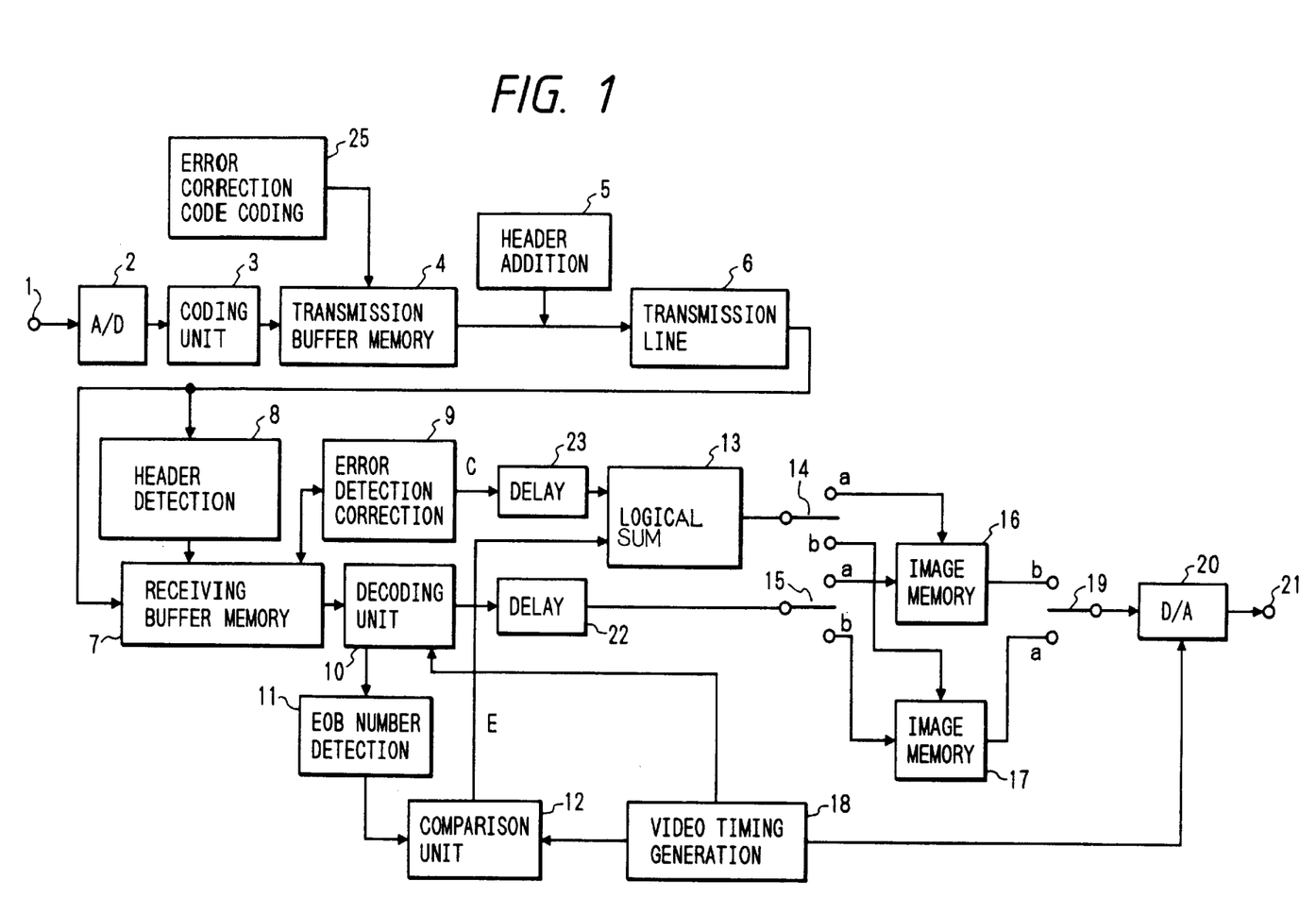
FIG. 1 is a block diagram showing a schematic construction of an image transmitting and receiving apparatus of an embodiment of the invention.

FIG. 1 is a block diagram showing a schematic construction of an image transmitting and receiving system as an embodiment of the invention. The system will now be described hereinbelow with reference to FIG. 1.

An analog image signal supplied from an input terminal 1 is converted into a digital signal by an A/D converter 2. The digital signal is subjected to a variable length compression coding by a coding unit 3 in such a manner as will be explained with reference to FIG. 6. A coded output of the coding unit 3 is supplied to a transmission buffer memory 4.

Figure 2:
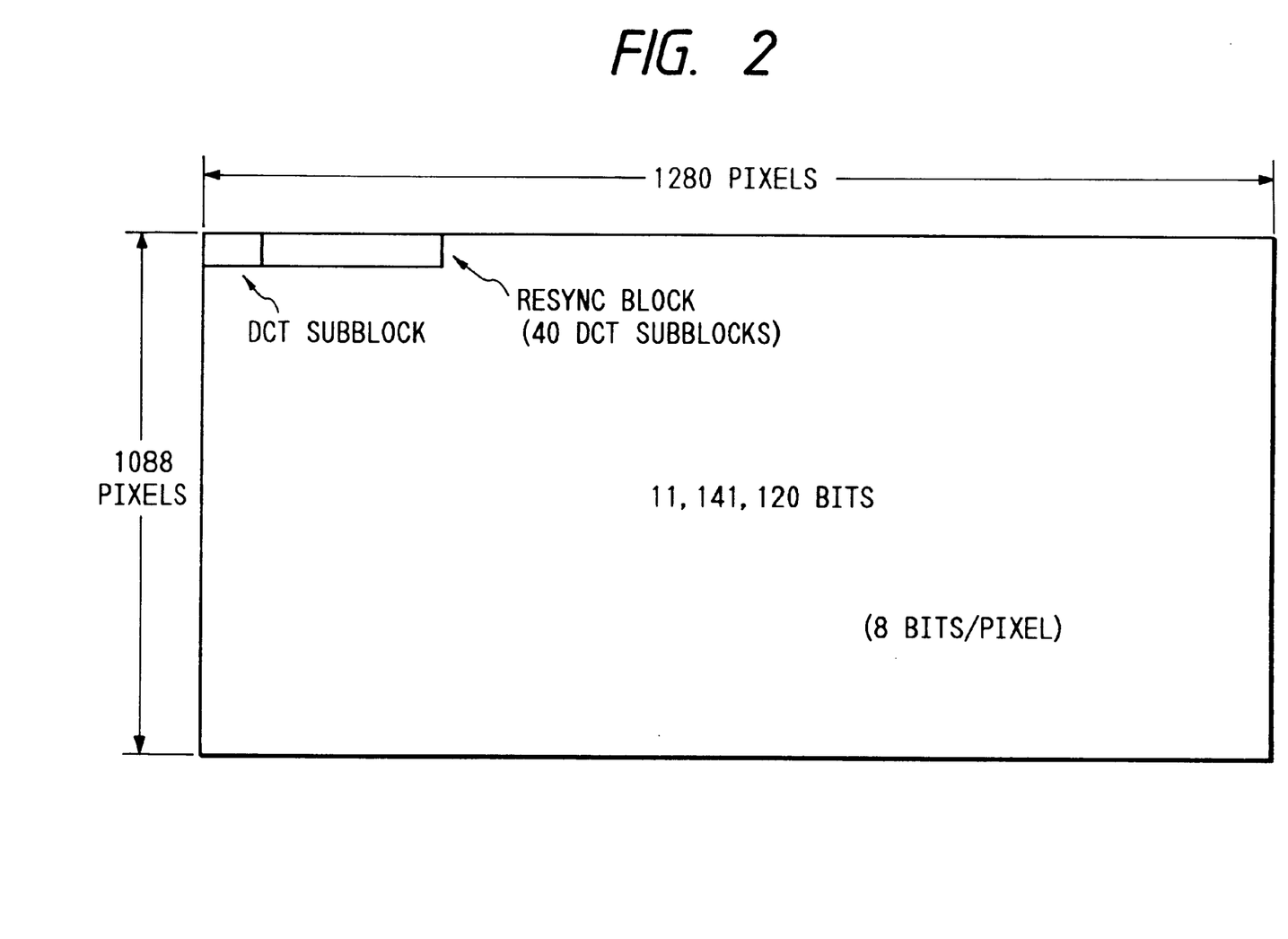
FIG. 2 is a diagram schematically showing information of one picture plane of an image that is transmitted by the image transmitting and receiving apparatus of FIG. 1.

FIG. 2 is a diagram schematically showing information of one picture plane of pixels to be transmitted. One picture plane is sampled by 1280 pixels in the lateral direction and 1088 pixels in the vertical direction. Each pixel is A/D converted by eight bits. A data capacity per picture plane is equal to $$1280 \times 1088 \times 8 = 11{,}141{,}120 \text{ bits.}$$

In the embodiment, it is assumed that a moving image is transmitted and when the data of one picture plane is transmitted every 30 picture planes for one second, a data capacity per second is equal to $$11{,}141{,}120 \times 30 = 334{,}233{,}600 \text{ bits/second.}$$

The case where such moving image information is compressed and coded into about 1/10 by the foregoing ADCT method and is transmitted will now be presumed.

One DCT subblock is constructed by (8 pixels in the lateral direction) × (8 pixels in the vertical direction). As shown in FIG. 2, one resync block is constructed by 40 DCT subblocks. When one picture plane is divided into regions on a resync block unit basis, it is divided into total 544 regions of (4 regions in the lateral direction) × (136 regions in the vertical direction) per picture plane.

A capacity per resync block is now equal to $$40 \times 8 \times 8 \times 8 = 20{,}480 \text{ bits.}$$

As described with reference to FIG. 6, the DC component and the AC component are individually coded in the coding unit 3. However, in the process of the AC component, a code indicative of the end of block coding (hereinafter, referred to as an EOB) is added after the last significant coefficient in one DCT subblock. The coding of the DCT subblock is finished.

Such operations are sequentially executed for 40 DCT subblocks, thereby completing the coding process to one resync block. The variable-length codes of a bit unit basis obtained as mentioned above are combined to a symbol comprising eight bits. A transmission sync block is, further, formed every predetermined number of symbols.

Boundary information indicative of a boundary between the resync blocks which have been processed as mentioned above is added to a header portion of the transmission sync block. Practically speaking, the boundary information is the information indicative of the position in the transmission sync block of the symbol corresponding to the boundary between the resync blocks.

Similarly, next 40 DCT subblocks are processed as a next resync block.

Reference numeral 25 denotes an error correction code coding circuit for forming an error correction code by adding a parity check bit to the digital image information by using the compressed digital image information stored in the transmission buffer memory 4.

A header addition unit 5 further adds a sync code, a transmission ID, or the like to the data which has been read out from the transmission buffer memory 4 every transmission sync block. A data train added with various kinds of codes by the header addition unit 5 are sent to a transmission line 6.

Reference numeral 6 denotes the transmission line. In case of the immediate transmission, the transmission line is a transmission medium such as optical fiber, satellite, ground ratio wave such as a microwave or the like, light space, or the like. In case of the accumulation transmission, the transmission line is a memory medium such as tape-shaped medium of a digital VTR, DAT, or the like, disc-shaped medium such as floppy disk, optical disc, or the like, solid-state medium such as semiconductor memory, or the like.

On the other hand, a transmission rate is determined by an information amount of the original image, a compression ratio, and a required transmitting time and is set to an arbitrary value within a range from tens of Kbits/second to tens of Mbits/second.

On the other hand, as for the data received from the transmission line 6, the synchronization is first detected by the foregoing sync code by a header detection unit 8 and the attribute of the transmission synchronization is subsequently detected by the transmission ID and stored into a receiving buffer memory 7. An error detection correction unit 9 accesses to the receiving buffer memory 7 and detects and corrects the errors mixed by the transmission line by using the parity check bit.

In the error detection correction unit 9, in the case where an uncorrectable code error occurs as a result of the error detection and correction, an uncorrectable flag is set to "1" and the signal from the error detection correction unit 9 is delayed by an uncorrectable flag delay unit 23 by a period of time during which the output of one resync block is generated from the memory 7.

The compression image data read out from the receiving buffer memory 7 is supplied to a decoding unit 10. The decoding unit 10 expands and decodes the compressed image data by the decoding process opposite to the coding process of the coding unit 3 by using the scaling factor S received within the period of time which has been managed by a video timing generation unit 18, thereby obtaining the original image data. It will be obviously understood that the time base of the image data generated from the decoding unit 10 coincides with that of the original image data.

In this instance, in an EOB number detection unit 11, the number of EOB which are generated on each DCT subblock unit basis is counted and the number of EOB in one resync block is detected. Now, assuming that the normal decoding is being executed, a time which is required to decode the data of one resync block is always equal to a predetermined period (one resync period), so that the number of EOB which are detected in one resync period is certainly equal to 40.

The video timing generation unit 18 supplies a pulse to a comparison unit 12 every resync block and detects whether the number of EOB in one resync block is equal to a predetermined number or not (40). If NO, the comparison unit 12 sets an error flag E "1".

A logical sum circuit 13 gets the OR of an error flag C from the error detection correction unit 9 and the error flag E from the comparison unit 12 and supplies the OR output to a switch 14.

Reference numerals 14, 15, and 19 denote data selectors each of which are alternately connected to the a side and b side every frame period. The output of the logical sum circuit 13 is supplied to the data selector 14. The image data which is generated from an image delay unit 22 for delaying the image data from the decoding unit 10 by one resync period is sent to the data selector 15.

Image memories 16 and 17 are provided to store the image data of one frame from a and b terminals of the data selector 15, respectively. The writing operations of the image memories 16 and 17 are controlled by the output of the logical sum circuit 13 which is supplied from the a or b terminal of the data selector 14. That is, when the output of the logical sum circuit 13 is equal to "1", the writing of the image data into the memories 16 and 17 is inhibited.

When even either one of the error flags C and E is equal to "1", new image data is not written. Therefore, the image data which is generated from the data selector 19 is the image data stored in the past and its updating is inhibited.

That is, in the image transmitting and receiving system of the embodiment, with respect to the resync block in which the error uncorrectable code has occurred due to the error correction code and the resync block in which the number of EOB after completion of the decoding doesn't coincide with the original number, it is determined that the errors occurred in both of these blocks. Therefore, the interpolation (error concealment) is executed by using the past image.

Figure 3:
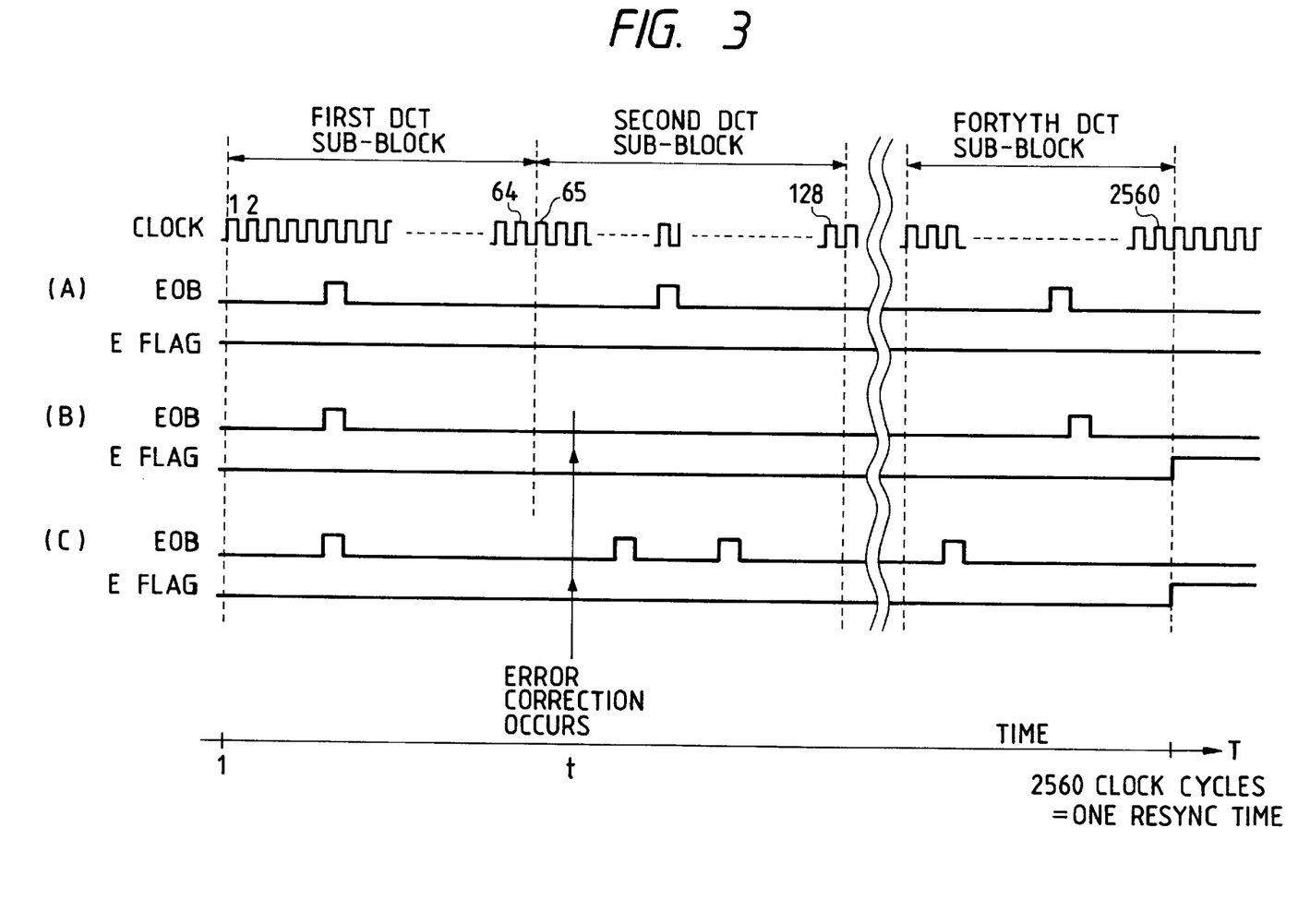
FIG. 3 is a timing chart for explaining the operation of the image transmitting and receiving apparatus of FIG. 1.

FIG. 3 is a timing chart for explaining the operation timing of the receiving section of the image transmitting and receiving system of the embodiment. A reproducing period of the IDCT subblock is set to 64 clock pulses. A reproducing period of one resync block is set to 2560 cycles.

First, in the case where no code error occurs and the normal decoding is being executed, as shown in FIG. 3(A), one EOB is certainly generated in the reproducing period of each DCT subblock, that is, within 64 clock cycles. Therefore, in this case, the number of EOB which are generated for 2560 clock cycles is certainly equal to 40 and the error flag E from the comparison unit 12 is set to "0".

In the case where the error correction is performed in the error detection correction unit at the timing shown at t in FIG. 3 and the code with a code error is supplied to the decoding unit 10 in spite of the fact that the error flag C is equal to "0", the number of EOB which occur after the timing t is not always equal to one per 64 clock cycles. That is, as shown in FIGS. 3(B) and 3(C), there is a case where no EOB occurs in one (the second) DCT subblock or two or more EOB occur.

In this case, therefore, 40 EOB are hardly obtained in one resync period (2560 clock cycles). The output of the EOB number detection unit 11 is not equal to 40. The error flag E which is generated from the comparison unit 12 is set to "1".

Since the error flag E is obtained with a delay time of one resync period, the image data is delayed by one resync period by the image delay unit 22 and the error flag C from the error detection correction unit 9 is also delayed by one resync period by the delay unit 23.

That is, with respect to the images of the resync block in which the decoding of each block is not accurately executed and the resync block in which the uncorrectable code error occurred in the error detection correction unit 9, the digital image signal which has been interpolated by the past image of the resync block at the same position on a resync block unit basis is generated from the data selector 19. The digital image signal which is generated from the data selector 19 is converted into the analog video signal by a D/A converter 20. The analog video signal is generated from an output terminal 21.

Figure 4:
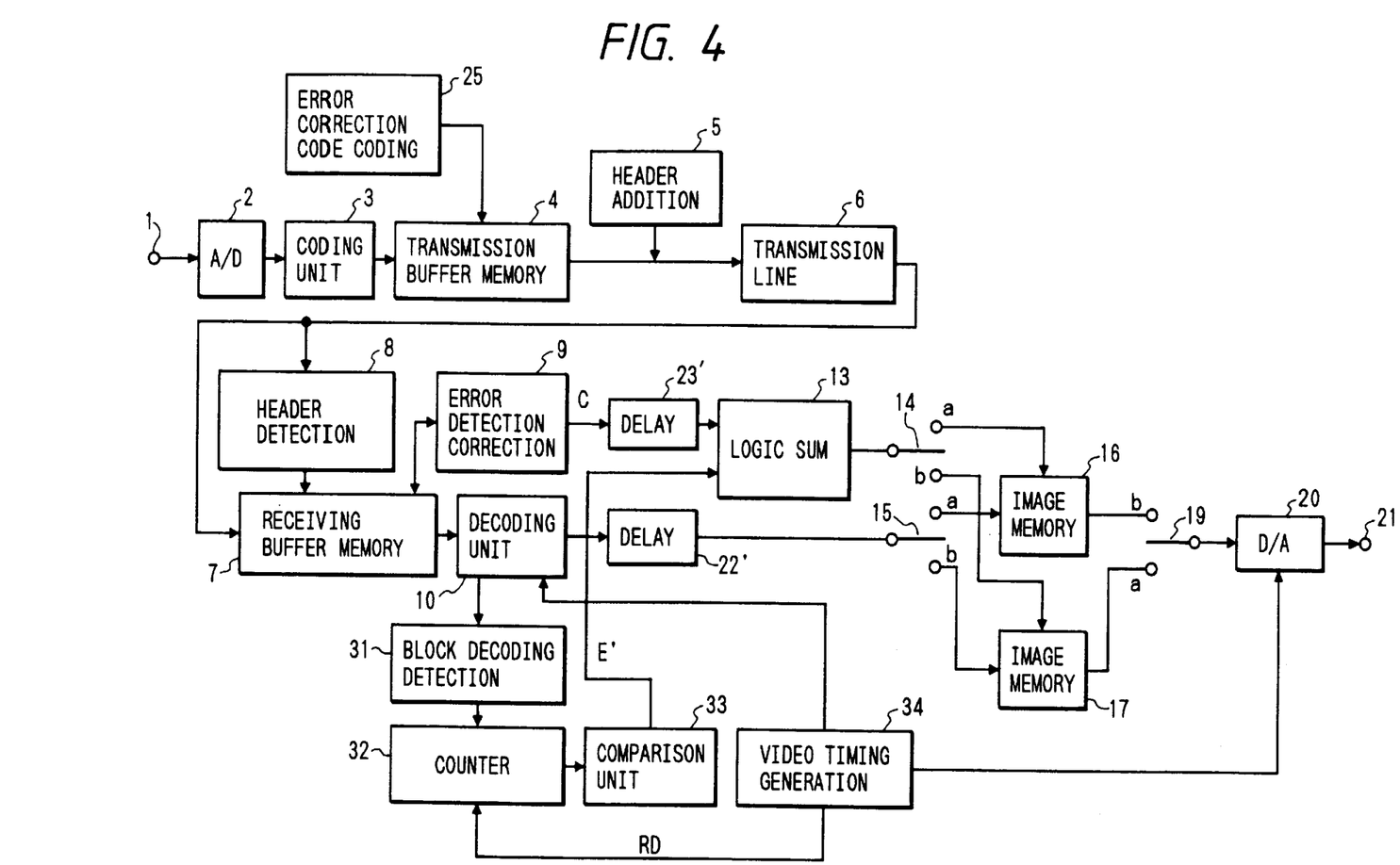
FIG. 4 is a block diagram showing a schematic construction of an image transmitting and receiving apparatus of another embodiment of the invention.

FIG. 4 is a diagram showing a construction of a digital image transmitting and receiving system of another embodiment of the invention. In the diagram, component elements similar to those in FIG. 1 are designated by the same reference numerals and their detailed descriptions are omitted here.

The decoding unit 10 in FIG. 4 executes the decoding process opposite to the coding process of the coding unit 3 in a manner similar to that mentioned in the above embodiment. The decoding process will now be described further in detail. Three processes of the run length Huffman decoding, inverse quantization, and inverse DCT conversion are sequentially executed. Although the inverse DCT conversion is inherently executed every DCT subblock mentioned above, a block decoding detection circuit 31 generates a pulse each time one DCT subblock is returned to the original image data by the inverse DCT conversion. A counter 32 counts the number of pulses.

A reset pulse RP to reset the counter 32 is generated from a video timing generation circuit 34 to a reset terminal of the counter 32 every frame. The number of decoded DCT subblocks in each frame is detected by the counter 32. A comparison unit 33 detects whether the count value of the counter is equal to a predetermined value at the end of each frame or not. An error flag E' is generated from the comparison unit 33 every frame.

In the embodiment, when the number of DCT subblocks decoded in one frame is not equal to the predetermined value, it is determined that a normal reproduction image is not obtained because of the occurrence of a miscorrection or the like in the error detection correction unit 9, so that the error flag E' is set to "1". Since the error flag E' is obtained with a delay time of one frame period, the error flag C and image data are respectively delayed by a period of one frame by delay units 23' and 22'.

The subsequent operations are similar to those in the first embodiment of FIG. 1. In the second embodiment as well, even in the case where the miscorrection occurs in the error detection correction unit 9, the image of the resync block in which the miscorrection has occurred is not reproduced nor generated but can be concealed by using the past picture plane.

In the system of each of the above embodiments, with respect to the resync block or frame having the code error, the number of blocks which should inherently be decoded for such a period of time is different from the number of blocks transmitted through the decoding unit. Therefore, by using such a difference, the occurrence of the code error can be detected without, particularly, raising a redundancy degree of the transmission code. On the basis of the result of the detection, the image information is corrected. Therefore, a large deterioration of the image can be prevented. For instance, the deterioration of the picture quality upon occurrence of the miscorrection due to the error correction code or the like can be minimized.

Many modifications and variations of the invention are possible without departing from the spirit and scope of the present invention. For instance, although each of the embodiments has been described on the assumption that the image signal is set to one kind of signal, in case of handling a color image signal, it will obviously be understood that a similar effect is derived by executing processes of color signals other than a luminance signal in a manner similar to that mentioned above.

In each of the above embodiments, the example in which the invention has been applied to the system which transmits data together with the error correction code and which has the error detection correction unit has been described. However, in a system using a transmission line like an optical fiber such that a code error hardly occurs, the invention can be also applied to a system which doesn't use any error correction code and which doesn't have the error detection correction unit. As a signal to be handled, the invention can be also similarly applied to not only a moving image but also a semi-moving image or a still image. Further, the coding method is not necessarily limited to what is called an ADCT method. The invention can be also similarly applied to a system for executing the variable-length coding on a block unit basis.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fallen within the true spirit and scope of the invention.

What is claimed is:

1. A decoding apparatus for decoding image information which has been variable-length coded on a block unit basis of a plurality of pixels, comprising:
    a) decoding means for decoding the image information on the block unit basis;
    b) counting means for counting the number of blocks transmitted through said decoding means every predetermined period;
    c) error detecting means for detecting an error in the image information in accordance with the number of blocks counted by said counting means; and
    d) concealing means for concealing the image information decoded by said decoding means in accordance with the output of said error detecting means.

2. An apparatus according to claim 1, wherein said image information is transmitted together with an EOB (end of block coding) code indicative of the end of coding on said block unit basis, and said counting means counts the number of EOB codes.

3. An apparatus according to claim 1, wherein said image information is divided into a plurality of groups of every predetermined number of said blocks and said predetermined period corresponding to a decoding period of each group.

4. An apparatus according to claim 3, wherein a DCT (Discrete Cosine Transform) method is used as a method of inversely coding said image information.

5. An apparatus according to claim 4, wherein said groups are each formed by a plurality of DCT blocks.

6. An apparatus according to claim 5, wherein a code which belongs to each of the groups has a variable length.

7. An apparatus according to claim 1, wherein said predetermined period corresponds to a decoding, period of one picture plane.

8. An apparatus according to claim 1, wherein the image information has an error check code added thereto, and wherein said error detecting means detects the error in the image information by using the error check code.

9. An apparatus according to claim 1, further comprising receiving means for receiving the image information and supplying the received image information to said decoding means.

10. An apparatus according to claim 9, further comprising recording means for recording on a recording medium the coded signal processed by said adding means.

11. A coding and decoding apparatus comprising:
   a) DCT converting means for DCT converting an input signal;
   b) quantizing means for quantizing the DCT converted signal;
   c) coding means for coding the signal quantized by said quantizing means;
   d) decoding means for decoding the coded signal on a resync block unit basis of a plurality of DCT blocks;
   e) counting means for counting the number of DCT blocks transmitted through said decoding means within a predetermined period; and
   f) concealing means for concealing the signal decoded by said decoding means in accordance with the number of DCT blocks counted by said counting means.

12. An apparatus according to claim 11, wherein the coded signal is transmitted together with an EOB (end of block coding) code indicative of the end of coding on a DCT block unit basis, and said counting means counts the number of said EOB codes.

13. An apparatus according to claim 11, further comprising adding means for adding a check code for error detection to the coded signal, wherein said concealing means detects an error by using the check code and conceals the signal according to a detection result.

14. A coding and decoding apparatus comprising:
   a) input means for inputting image information;
   b) dividing means for dividing the image information of one picture plane into a plurality of blocks;
   c) coding means for coding the image information divided by said dividing means;
   d) decoding means for decoding the image information coded by said coding means;
   e) counting means for counting the number of blocks transmitted through said decoded means within a predetermined period;
   f) error detecting means for detecting an error in the image information in accordance with the number of blocks counted by said counting means; and p1 g) concealing means for concealing the image information decoded by said decoding means in accordance with the output of said error detecting means.

15. An apparatus according to claim 14, wherein said image information is transmitted together with an EOB (end of block coding) code indicative of the end of coding on a block unit basis, and said counting means counts the number of said EOB codes.

16. An apparatus according to claim 14, wherein said image information is divided into a plurality of groups of every predetermined number of said blocks, and said predetermined period corresponds to a decoding period of each group.

17. An apparatus according to claim 16, wherein said group is formed by a plurality of DCT blocks.

18. An apparatus according to claim 14, wherein said predetermined period corresponds to a decoding period of one picture plane.

19. An apparatus according to claim 14, wherein an ADCT (Adaptive Discrete Cosine Transform) method is used as a method of coding said image information.

20. An apparatus according to claim 14, further comprising adding means for adding a check code for error detection to the coded image information, wherein said error detecting means detects an error in the image information by using the check code.

21. An apparatus according to claim 20, further comprising recording means for recording the coded image information processed by said adding means.

22. A decoding method of decoding image information of a plurality of pixels which has been variable-length coded on a block unit basis, comprising:
   a decoding step of decoding the image information on the block unit bases;
   a counting step of counting the number of blocks decoded by said decoding step every predetermined period;
   an error detecting step of detecting an error in the image information in accordance with the number of blocks counted by said counting step; and
   a concealing step of concealing the image information decoded by said decoding step in accordance with the output of said error detecting step.

23. A coding and decoding method comprising:
   a DCT converting step of DCT converting an input signal;
   a quantizing step of quantizing the DCT converted signal;
   a coding step of coding the signal quantized by said quantizing step;
   a decoding step of decoding the coded signal on a resync block unit basis of a plurality of DCT blocks;
   a counting step of counting the number of DCT blocks decoded by said decoding step within a predetermined period; and
   a concealing step of concealing the signal decoded by said decoding step in accordance with the number of DCT blocks counted by said counting step.

24. A coding and decoding method comprising:
   an input step of inputting image information;
   a dividing step of dividing the image information of one picture plane into a plurality of blocks;
   a coding step of coding the image information divided by said dividing step;
   a decoding step of decoding the image information coded by said coding step;
   a counting step of counting the number of blocks decoded by said decoding step within a predetermined period;
   an error detecting step of detecting an error in the image information in accordance with the number of blocks counted by said counting step; and
   a concealing step of concealing the image information decoded by said decoding step in accordance with the output of said error detecting step.

* * * * *

UNITED STATES PATENT AND TRADEMARK OFFICE
CERTIFICATE OF CORRECTION

PATENT NO.    : 5,995,171

DATED    : November 30, 1999

INVENTOR(S)    : TAKEHIRO YOSHIDA

It is certified that error appears in the above-identified patent and that said Letters Patent is hereby corrected as shown below:

COLUMN 1

Line 5, "continuation-in part" should read --continuation--.

COLUMN 9

Line 4, "decoding," should read --decoding--; and
    Line 57, "p1g)" should read --¶g)--.

COLUMN 10

Line 24, "bases;" should read --basis--.

Signed and Sealed this

Twenty-seventh Day of February, 2001

*Attest:*

NICHOLAS P. GODICI

*Attesting Officer*     Acting Director of the United States Patent and Trademark Office